United States Patent [19]

Kuchel

[11] Patent Number: 5,361,312
[45] Date of Patent: Nov. 1, 1994

[54] METHOD AND APPARATUS FOR PHASE EVALUATION OF PATTERN IMAGES USED IN OPTICAL MEASUREMENT

[75] Inventor: Michael Kuchel, Oberkochen, Germany

[73] Assignee: Carl-Zeiss-Stiftung, Heidenheim

[21] Appl. No.: 44,105

[22] Filed: Apr. 8, 1993

Related U.S. Application Data

[63] Continuation of Ser. No. 694,656, May 2, 1991, abandoned.

[30] Foreign Application Priority Data

May 2, 1990 [DE] Germany ............... 4014019

[51] Int. Cl.$^5$ .......................................... G06K 9/00
[52] U.S. Cl. ................................. 382/44; 382/48; 356/358; 324/76.77
[58] Field of Search ............. 382/44, 45, 46, 48; 356/358, 363; 235/462; 324/76.77

[56] References Cited

U.S. PATENT DOCUMENTS

| 4,506,333 | 3/1985 | Porrot et al. ............... 364/487 |
| 4,744,659 | 5/1988 | Kitabayashi ............... 356/353 |
| 4,872,755 | 10/1989 | Küchel ............... 356/360 |

FOREIGN PATENT DOCUMENTS

| 262080 | 11/1988 | Germany . | |
| 1256053 | 9/1986 | U.S.S.R. ............... | 382/44 |
| 1366966 | 1/1988 | U.S.S.R. ............... | 324/83 R |

OTHER PUBLICATIONS

Patent Abstracts of Japan, unexamined applications, Aug. 4, 1988, P Field, vol. 12, No. 284, The Patent Office Japanese Government, Method and Device for Analyzing Interference Fringe, No. 63–61925 (18 Mar. 1988).

"Interferometric Phase Measurement Using Spatial Synchronous Detection", by K. H. Womack, *Optical Engineering*, vol. 23, No. 4, pp. 391–395 (1984).

"Digital Wave-Front Measuring Interferometry: Some Systematic Error Sources", by J. Schwider et al., *Applied Optics*, vol. 22, No. 21, pp. 3421–3432 (1983).

*Primary Examiner*—David K. Moore
*Assistant Examiner*—Andrew W. Johns
*Attorney, Agent, or Firm*—Walter Ottesen

[57] ABSTRACT

The invention relates to measuring a phase-modulated signal 5. The signal is measured along at least five different steps (P1–P5) corresponding to preselected phase angles of the carrier wave 4. From the associated sets of measured values, at least three sets of measured values are formulated in a manner that from each of the sets a phase value [$\phi_i = \arctan(Z_i/N_i)$ where i is equal to or greater than 3] can be calculated. The same correct phase value is computed based upon these three sets for a signal with the frequency of the carrier wave. The essence of the invention is finding that linear combinations of $a_i Z_i$ and $a_i N_i$ can be used for the computation of an accurate phase measurement where the factors $a_i$ are selected so that the phase error, as a function of the preselected phase steps, has at least three zero positions among the measured phase steps (P1–P5). As a result, the systemic errors that normally accompany phase measuring are significantly reduced. The invention is particularly suitable for the evaluation of bar pattern images and multiple-bar pattern images.

10 Claims, 6 Drawing Sheets

Fig. 2b

Fig. 3

METHOD AND APPARATUS FOR PHASE EVALUATION OF PATTERN IMAGES USED IN OPTICAL MEASUREMENT

RELATED APPLICATIONS

This is a continuation of copending parent application Ser. No. 694,656, filed May 2, 1991, entitled METHOD AND APPARATUS FOR PHASE EVALUATION OF PATTERN IMAGES USED IN OPTICAL MEASUREMENT, and abandoned upon the filing of this continuation application.

TECHNICAL FIELD

The invention relates to measuring the phase of a signal which is modulated on a carrier wave by phase modulation, the intensity of the modulated signal being recorded and measured at different phase angles of the carrier wave. The measured intensities are used to determine values representative of the sine (Z) and cosine (N) of the phase value, which is then calculated from the ratio Z/N.

BACKGROUND

This type of measurement is used in many fields of measuring technology and is a particularly useful technique for optical measuring. The actual measuring signal is superimposed on a carrier wave so that the measurement is expressed by a modulation of the frequency or phase of the combined signal. In phase-measuring technology, the signal is measured along a plurality of different phase steps defined by preselected phase angles of the carrier wave. For instance, the simplest known formula for such evaluation results when three measured values, at phase angles $\pi/4$, $3\pi/4$, and $5\pi/4$ relative to the carrier wave, are recorded.

Due to the effect of the phase modulation, the combined signal is actually measured at slightly different phase angles, that is, the phase angles relative to the combined signal do not exactly correspond to the desired phase angles relative to the carrier wave. As a result, erroneous phase values of the modulation signal are measured systematically. Therefore, the results achieved with this type of method are adequately accurate only when the frequency of the modulation signal is considerably lower than the frequency of the carrier wave.

Phase-measuring techniques are often used in optical-measuring technology for the evaluation of bar pattern images. For example, U.S. Pat. No. 4,744,659 to Kitabayashi discloses an interferometer where the reference and measuring beams interfere at predetermined angles of inclination relative to a detector surface. As a result of this inclination of the two beams, a bar pattern representing a spatial carrier wave is generated on the detector surface. The frequency of this carrier wave is determined by the angle of inclination. Deviations of the surface profile of the measured surface from the surface profile of the reference mirror result in a spatial modulation of the bar image, that is, the phase angle of the bar image deviates locally from the phase angle of the carrier wave by an amount which is determined by the angle of inclination. The intensity distribution of the bar pattern is measured and, as a result of two Fourier transformations of the intensity distribution, the deviation of the phase angle of the bar pattern from the carrier wave is computed. By means of a window function, a sideband of the spatial frequency spectrum is filtered out.

However, the two Fourier transformations require such a significant amount of computation time that an evaluation of the interferograms in video real time is not possible. In addition, filtering out the sideband has the effect of a low-pass filter, thereby changing the measured value.

An alternative method for evaluating multiple-bar interferograms by Fourier transformation has been disclosed in *Optical Engineering*, Vol. 23, No. 4, page 391 (1984), where the measured intensity distribution of the bar pattern is first multiplied by a function of the frequency of the carrier wave, and then a convolution of the product is performed with a window function. This window function is selected in such a way that—for calculating the phase value in one point of the interferogram—the interferogram intensities of a spatial region covering several periods of the carrier wave are used. However, also with this method, the convolution of the measured intensity values over several periods of the carrier wave has the effect of a low-pass filter, resulting in a reduction of spatial resolution. Further, this prior art method does not provide an analysis of errors occurring in the computation of phase values, particularly when the bar frequency deviates from the carrier frequency.

Therefore, known phase-measuring technology is burdened by the above-mentioned systemic errors, and the methods for evaluation of multiple-bar interferograms provide correct phase values principally only when the bar frequency of the bar pattern corresponds to the bar frequency determined by the angle of inclination, that is, when the profile of the measured surface corresponds fairly closely to the profile of the reference surface. Further, since this method measures the deviations of both profiles, the values relating to the sample being measured exhibit this systemic error.

Another known phase-measuring technique, sometimes referred to as phase-shift interferometry, has been described in *Applied Optics*, Vol. 22, No. 21, page 3421 (1983). According to this method, several interferograms are recorded at time intervals without a spatial carrier wave. Instead, a time carrier wave is generated in that, between the recording of each interferogram, the reference mirror is shifted parallel to the optical axis (n-1) times by the same distance $\lambda/2n$, where $\lambda$ is the wavelength of the light in the interferometer. This results in a phase shift of $2\pi/n$, where n is the number of interferograms. By using at least four interferograms, identical points on each of the interferograms can be used to calculate a phase value $\phi=\text{arc tangent}(Z/N)$, where Z and N (relating, respectively, to the sine and cosine functions of the phase value) are computed from the intensities of the respective interferograms.

The accuracy attainable with this just-described phase-shift method is essentially a function of the accuracy with which the reference mirror is shifted relative to the intended position. Therefore, high-quality expensive piezo translators are used for shifting.

An analysis of the error in phase value, as a function of the phase shift which has in fact occurred, shows that, in the case of the intended phase shift, the error has a value of zero; and in the case of any deviation from the intended phase shift, the error increases quantitatively in a linear direction. The last-cited reference suggests that the measuring procedure be carried out twice in sequence. Between the two passes, the phase is shifted again by $\pi/2$. If, after the first pass, the phase value is computed based on the equation $\tan(\phi_1)=Z_1/N_1$ and, after the second pass, based on the equation $\tan(\phi 2)=Z_2/N_2$, an improved phase value $\tan(\phi)=(Z_1+Z_2)/(N_1+N_2)$ is obtained.

The present invention is a method of the above-described type in which systemic measuring errors are significantly reduced.

SUMMARY OF THE INVENTION

At least three sets of measured values are recorded so that, from each of said three sets of measured values, a phase value $\phi_i=\arctan(Z_i/N_i)$ can be computed (i is the i-th measured value set, $i=1, 2, \ldots, m$; $m \geq 3$). For a signal having the frequency of the carrier wave, the same correct phase value $\phi=\phi_i$ for all i is computed correctly from all three sets of measured values. The significant feature of the inventive method is that now the linear combination of $Z_i$ and $N_i$ can be used to compute a correct phase value $$\phi = \arctan\left[\left(\sum_{i=1}^{m} a_i Z_i\right) / \left(\sum_{i=1}^{m} a_i N_i\right)\right]$$

The $a_i$ are selected in such a manner that the phase error, as a function of the phase shift, has at least three zero positions. It is also possible to select the $a_i$ so that two or more of the zero positions may change to a single zero position, so that the error function, as well as the first and the second derivation of the error function, has a value of zero at the zero position. Defining equations for the $a_i$ may be obtained by applying the same values to the expressions $$\left(\sum_{i=1}^{m} a_i Z_i\right) / \left(\sum_{i=1}^{m} a_i N_i\right)$$

for several different phase steps.

As has been disclosed in *Applied Optics*, Vol. 22, No. 21, Page 3421 (1983), the phase error response, as a function of the actual phase steps, is proportional to sin $2\phi$ with one amplitude. Quantitative maxima of the phase error occur in the immediate range of phase values $\phi=-135°$, $\phi=-45°$, $\phi=45°$, $\phi=135°$. The error function of the phase value is identified as the maximum amplitude that results when the actually measured phase steps deviate from the nominal phase steps.

The invention is based on the finding that the number of zero positions of the error function may be greater when more sets of measured values in the linear combination are used. Preferably, for each of said sets, the signal is measured at three different phase angles. The number of measured values in each set can be minimized. Further, a few of the same measured values can belong to several different sets of measured values. If the signal is measured overall at m different phase angles, the evaluation may be expressed by a formula with an error function of (m-2) zero positions.

Preferably, all measured values should also be recorded within one period of the carrier wave. This results in a high measuring resolution, and there is little low-pass filtering.

The inventive method is especially suitable for the evaluation of bar images, particularly multiple-bar images. Multiple-bar images may be generated by interferometry or by recording a bar pattern projected on a sample. The inventive method permits a highly accurate separate analysis of individual multiple-bar images. However, even when the inventive method is used in multiple-bar interferometry, a high measuring accuracy is still assured.

The hardware for carrying out the method of the invention comprises at least five detectors that measure the signal at five different phase angles. The output signals of each detector are fed to two different amplification units where said output signals are amplified by fixed factors and accumulated in two different addition units. Using the amplified and accumulated detector signals, an analyzing unit computes a corresponding phase value by forming the arc tangent of the quotient of the output signals of both addition units. The just-described operation may be carried out rapidly with modern digital electronics, the computation of the phase $\phi$ from the two values Z and N being accomplished by accessing a look-up table. The amplification factors of the two amplification units for each detector are selected so that the phase error, as a function of the phase steps, has at least three zero positions. When the detectors are opto-electronic sensors, the phase value for each point of an optical-bar pattern can be calculated very accurately.

In the preferred embodiment, opto-electronic sensors are arranged in a matrix in which the numbers of lines and columns are equal, and spatial resolution is improved by running the bars of the bar pattern diagonal to the lines and columns of the sensors. Preferably, the camera comprises a CCD sensor, and the bar pattern is run diagonal to the columns and lines of the camera sensor.

The invention achieves high spatial resolution and accurate analysis of an individual multiple-bar image by providing two convolution components that—by convolving the brightness values of an image recorded by the camera—compute the sine (Z) and cosine (N) of the phase angle of the modulated signal from which a phase value belonging to each image point is computed. The weighted convolution values (with which the brightness values are individually multiplied) are selected in such a manner that the phase error, as a function of the phase shift, has at least three zero positions.

The invention permits analysis of multiple-bar image patterns in video real time with an arrangement that is insensitive to external interferences, for example, vibrations.

DRAWINGS

FIG. 2b is a schematic representation of the camera sensor of FIG. 2a.

DETAILED DESCRIPTION

Figure 1A:
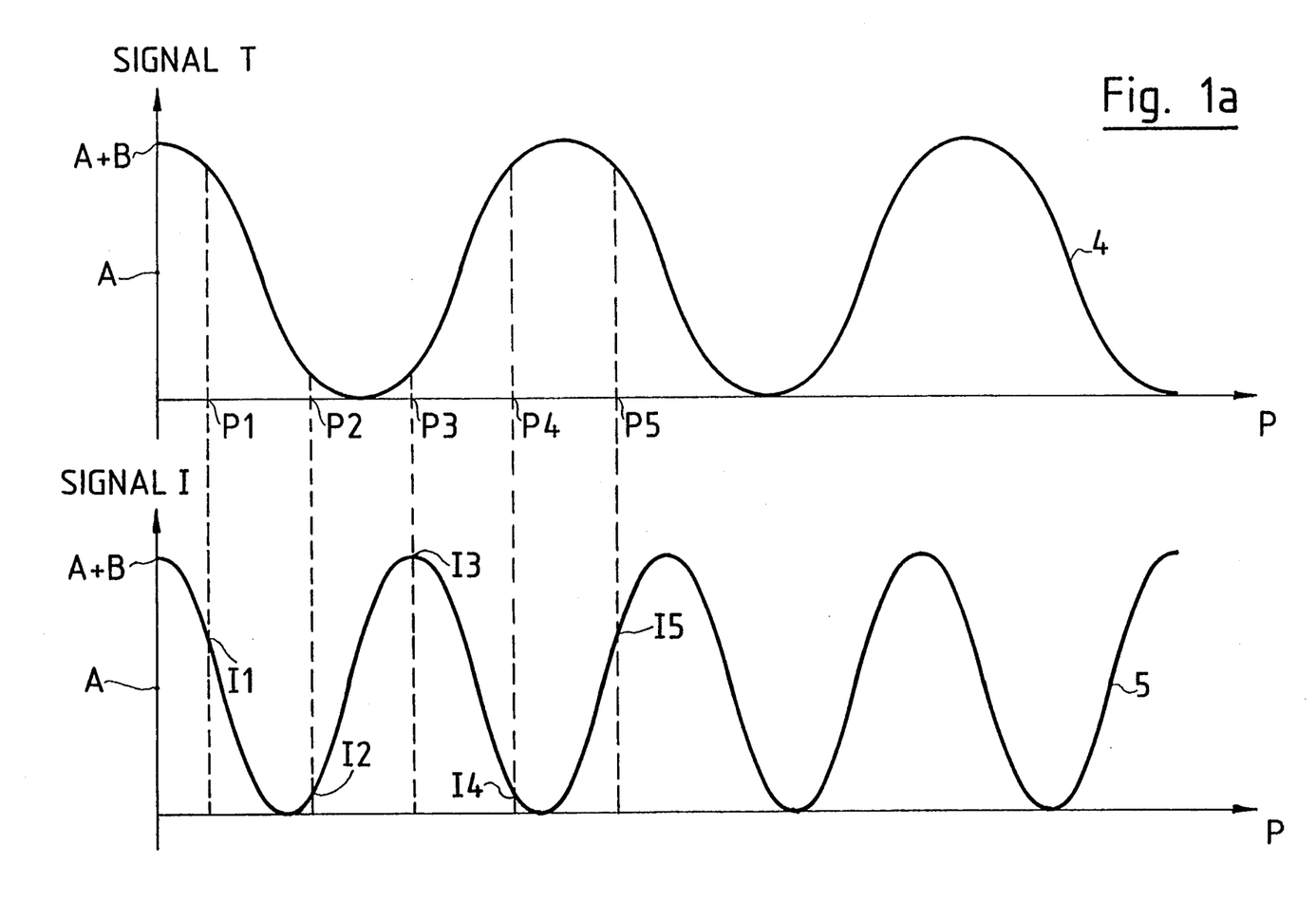
FIG. 1a is a schematic diagram depicting (a) a carrier wave (bar pattern or light frequency), (b) a phase-modulated signal resulting from the superimposition of the carrier wave and its reflection as distorted by the object being measured, and (c) five selected points for comparing the phase of the two signals.

FIG. 1a shows a phase-modulated signal 5 expressed as $I(P)=A+B\cos(\phi+P)$, where the variable P may define either location or time. Signal 5 results from the phase modulation of the periodic carrier wave 4 which is expressed as $T(P)=A+B\cos(P)$. The problem to be solved by phase-measuring technology is to measure the phase value $\phi$ as a function of the variable P. The first option, in which the variable P identifies location, is particularly applicable to the analysis of multiple-bar images. The second option, in which the variable P identifies time, has particular applicability to phase-shift interferometry where several temporally recorded interferograms are analyzed.

The phase-modulated signal I(P) is measured at five different phase angles, that is, at five different values (P1 to P5) of the variable P. The differences between these phase angles represent preselected "phase steps". The related phase-modulated signals I1 through I5 are given by the following 5 equations:

$$I1 = A + \cos[P1]*B*\cos[\phi] - \sin[P1]*B*\sin[\phi]$$

$$I2 = A + \cos[P2]*B*\cos[\phi] - \sin[P2]*B*\sin[\phi]$$

$$I3 = A + \cos[P3]*B*\cos[\phi] - \sin[P3]*B*\sin[\phi]$$

$$I4 = A + \cos[P4]*B*\cos[\phi] - \sin[P4]*B*\sin[\phi]$$

$$I5 = A + \cos[P5]*B*\cos[\phi] - \sin[P5]*B*\sin[\phi] \quad (1)$$

With these five equations, three different determinations can be made of the phase values at point P3, namely, by using (I1, I2, I3); (I2, I3, I4); and (I3, I4, I5); each of which should produce the same phase value $\phi = \phi1 = \phi2 = \phi3$:

$$\phi_1 = \arctan[(I1*(\cos[P2]-\cos[P3])+I2*(\cos[P3]-\cos[P1])+I3*(\cos[P1]-\cos[P2]))/(I1*(\sin[P2]-\sin[P3])+I2*(\sin[P3]-\sin[P1])+I3*(\sin[P1]-\sin[P2]))]$$

$$\phi_2 = \arctan[(I2*(\cos[P3]-\cos[P4])+I3*(\cos[P4]-\cos[P2])+I4*(\cos[P2]-\cos[P3]))/(I2*(\sin[P3]-\sin[P4])+I3*(\sin[P4]-\sin[P2])+I4*(\sin[P2]-\sin[P3]))]$$

$$\phi_3 = \arctan[(I3*(\cos[P4]-\cos[P5])+I4*(\cos[P5]-\cos[P3])+I5*(\cos[P3]-\cos[P4]))/(I3*(\sin[P4]-\sin[P5])+I4*(\sin[P5]-\sin[P3])+I5*(\sin[P3]-\sin[P4]))]$$

However, in accordance with the invention herein, the three phase values $\phi1$, $\phi2$, $\phi3$ are not computed separately as just set forth. Instead, an average phase value $\phi$ is determined as follows:

$$\phi = \arctan Z/N = \arctan[(a_1 Z_1 + a_2 Z_2 + a_3 Z_3)/(a_1 N_1 + a_2 N_2 + a_3 N_3)] \quad (2)$$

The expressions Z and N represent, respectively, sine and cosine functions of the phase angle of the modulated wave and, therefore, their ratio Z/N represents the tangent of the phase angle. The individual expressions $Z_1$, $Z_2$, $Z_3$ and $N_1$, $N_2$, $N_3$ are calculated from the measured intensities of the signal, while the factors $a_1$, $a_2$, $a_3$ are selected such that the phase error, as a function of the phase steps, has at least three zero positions.

These various expressions will now be discussed in greater detail.

If the phase-modulated signal is measured generally at k values of the variable P, instead of at just five values of the variable P, the linear combinations of a total of (k−2) expressions $Z_1$, $N_1$ with i=1 through (m=k−2) can be used to compute the phase value:

$$\phi = \arctan\left[\left(\sum_{i=1}^{m} a_i Z_i\right) / \left(\sum_{i=1}^{m} a_i N_i\right)\right] \quad (3)$$

In this general case, the $a_i$ are selected so that the phase error, as a function of the phase steps, has (m) zero positions. A few of these zero positions may also have changed to a higher order. In order to compute these $a_i$, additional defining equations are formulated by using the intensity values for each of these further positions and then making their respective equations $$\left(\sum_{i=1}^{m} a_i Z_i\right) / \left(\sum_{i=1}^{m} a_i N_i\right)$$

equal to each other.

In the specific example shown in FIG. 1a, phase-modulated signal 5 is measured at values (P1-P5) of the variables P which are shifted relative to carrier wave 4 by 90° in each case. The nominal phase steps are all identical in this case and are 90°.

Figure 1B:
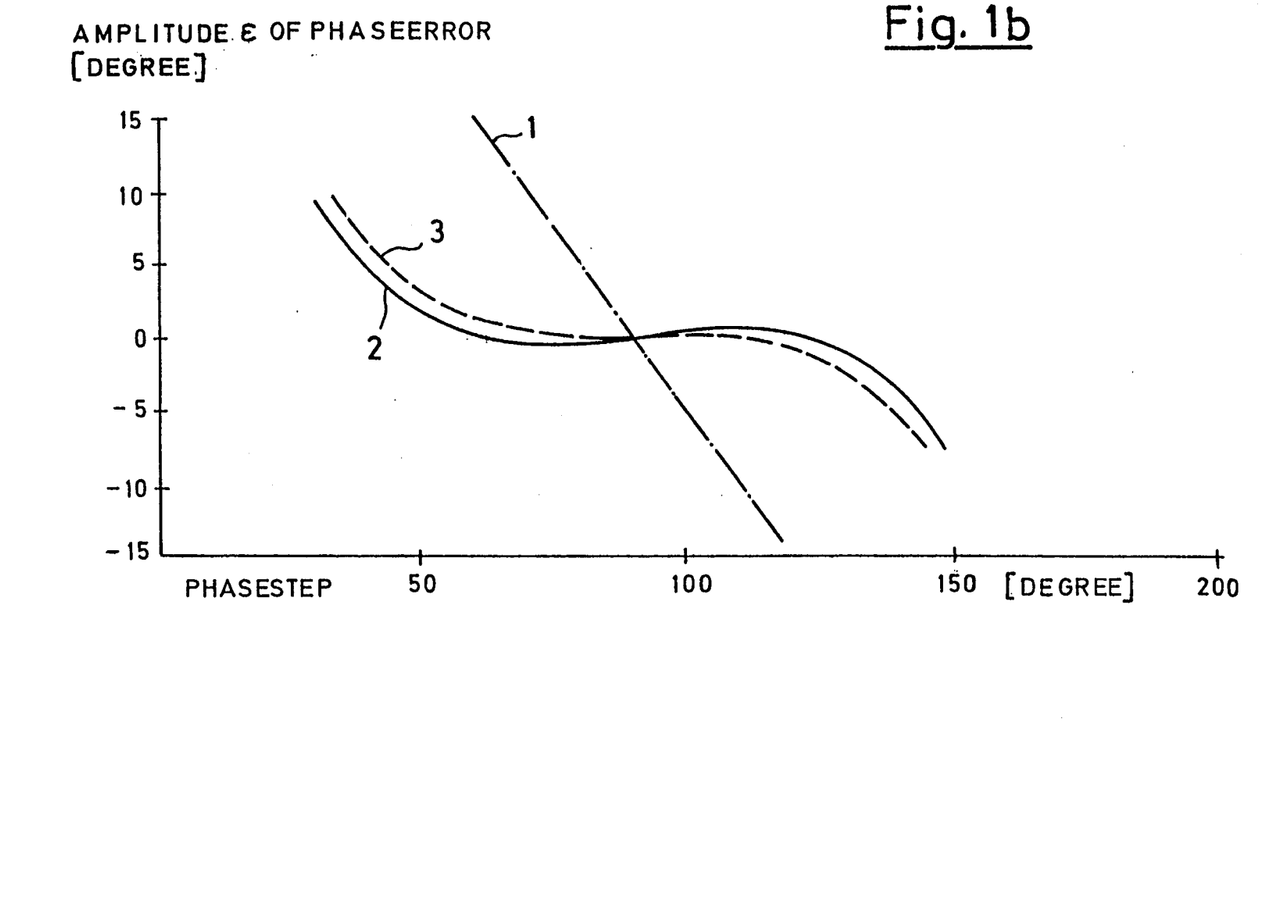
FIG. 1b is a schematic representation of phase errors as a function of preselected phase steps, the three curves being based upon different analytical formulae.

FIG. 1b shows examples of phase errors, plotted as a function of the phase steps, when the measured phase step deviates from the nominal step. As disclosed in *Applied Optics*, Vol. 22, 21, page 3421 (1983), phase error as a function of the phase step indicates a response between the measured points which is proportional to sin (2$\phi$) with an amplitude E. Quantitative maxima occur in this case in the immediate vicinity of the phase values $\phi = -135°$, $\phi = -45°$, $\phi = 45°$, $\phi = 135°$. The error function of the phase values is the maximum amplitude E of the resulting deviation between the measured and nominal phase steps.

In FIG. 1b, the phase error curve (1) results with the use of only three measured points for computation of the phase value $\phi$. This error function shows that the correct phase value can be computed only when the measured distance between adjacent phase-step points (P1-P5) is exactly equal to the nominal phase step, $\pi/2$. If the phase steps deviate from this nominal phase step, the phase error increases quantitatively linearly for each successive deviation from the nominal phase step.

Error curves (2) and (3) result when five measured points (P1-P5) are used, i.e., where k=5 in equation (3). Curve (2) identifies the error when the following values are selected: $a_1 = 1$, $a_2 = \sqrt{3}$, and $a_3 = 1$; namely, the error is zero at phase steps of 60°, 90°, and 120°. Using different values, curve (3) identifies the error when $a_1 = 1$, $a_2 = 2$, and $a_3 = 1$; error function (3) has a triple zero position at the phase step of 90°. It can be seen that curves (2) and (3) are substantially flatter than curve (1), and that as a result of the values selected for $a_i$ in each of these cases, even if the distances between measured points (P1-P5) deviate from the nominal phase steps, the error of the calculated phase values remains low. When the phase value $\phi$ is calculated using equation (3) with selected values for $a_i$ which result in zero error at least at three of the phase-step angles, the error remains low.

Figure 2A:
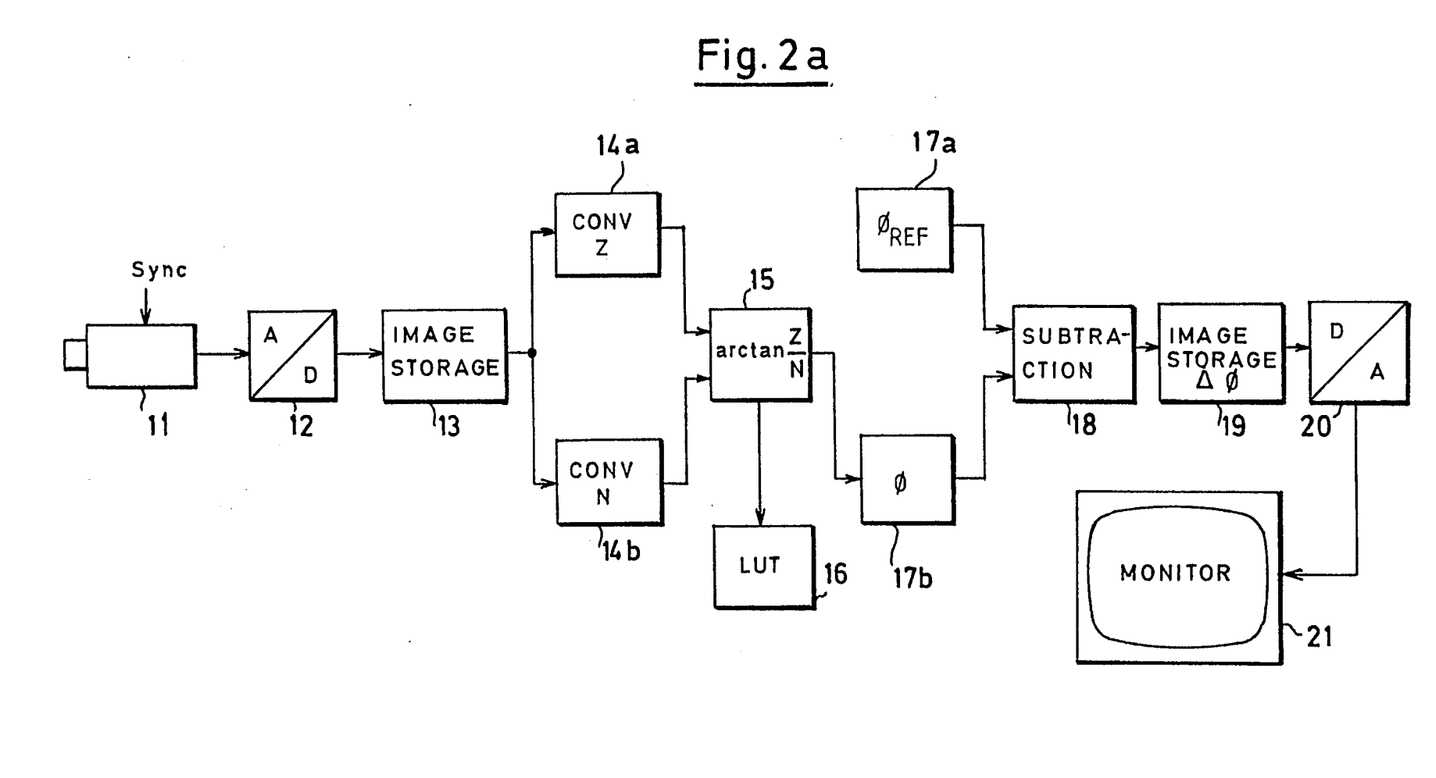
FIG. 2a is a schematic block diagram of a preferred embodiment of electronic apparatus for carrying out the inventive method.

A camera 11 records a two-dimensional bar pattern, and its output signals are digitized in an analog-to-digital converter and fed to an image storage 13. The image storage acts only as a buffer. It may be omitted if the subsequent analytical circuit is sufficiently fast. The digitized camera signals are then fed to two convolution blocks 14a, 14b. Convolution block 14a computes a first expression (Z) by a two-dimensional convolution operation, and convolution block 14b computes a second expression (N), also by a convolution operation.

These two-dimensional convolution operations in convolution blocks 14a, 14b can best be explained by reference to FIG. 2b, which shows a 10×10-pixel section of camera sensor 11a in which each image point is identified as a square. A portion of the recorded bar pattern is indicated by the dotted lines 22. This bar pattern extends diagonally to the lines and columns of camera sensor 11a.

For each image point of camera sensor 11a, a related phase value is computed that considers the measured intensity values of its eight adjacent image points. Therefore, to determine the intensity value for each point, the measured intensity values within a convolution window of 3×3 points are convolved; and, within each such convolution window, each point ($P_{ij}$)- (i=4,5,6; j=2,3,4) is associated with two weighted convolution values ($Z_{ij}$) and ($N_{ij}$), where ($Z_{ij}$) is implemented in convolution block 14a and ($N_{ij}$) is implemented in convolution block 14b.

Below is a list of weighted convolution values ($Zij$) and ($Nij$) associated with the points ($Pij$) of the convolution window:

| $P_{ij}$ | $Z_{ij}$ | $N_{ij}$ |
| --- | --- | --- |
| P42 | −2 | −2 |
| P52 | 3 | −1 |
| P62 | 0 | 2 |
| P43 | 3 | −1 |
| P53 | 0 | 4 |
| P63 | −3 | −1 |
| P44 | 0 | 2 |
| P54 | −3 | −1 |
| P64 | 2 | −2 |

Using these weighted convolution values ($Z_{ij}$, $N_{ij}$), the measured intensity values of the camera sensor at the respective points ($P_{ij}$) are multiplied in convolution block 14a, and then these nine convolution products are added to the expression $$Z = \sum_{i,j} Z_{ij} I[P_{ij}]$$

Analogously, the weighted convolution values ($N_{ij}$) are multiplied in convolution block 14b with the measured intensity values of the camera sensor at the point ($P_{ij}$) and then added to the expression $$N = \sum_{i,j} N_{ij} I[P_{ij}]$$

Figure 2B:
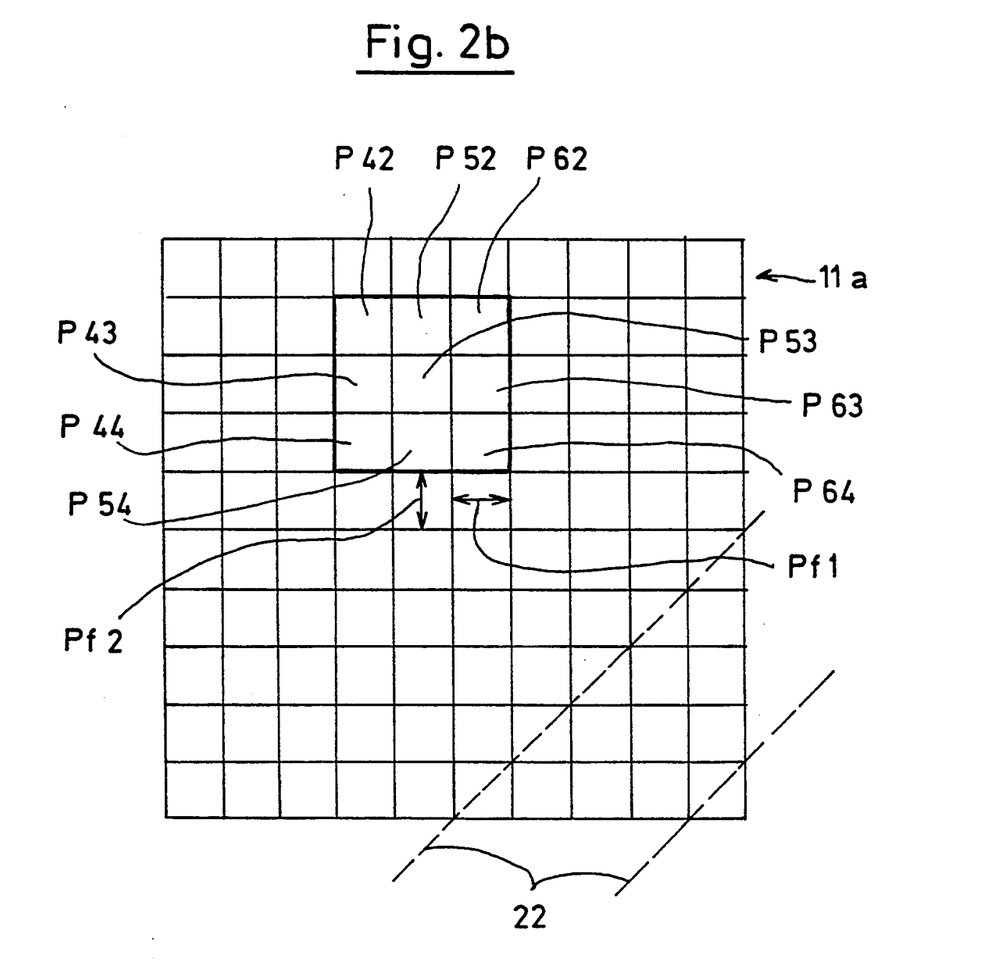

These summed values for expressions Z and N are then associated with that image point which is in the center of each convolution window, that is, with the point marked P53 in the window illustrated in FIG. 2b.

The outputs of both convolution blocks 14a, 14b are fed to an arctan block 15 that computes the arc tangent from the ratio Z/N of the two calculated expressions Z and N. For this purpose, the function values of the arc tangent are stored in a look-up table. The phase values $\phi$, which are computed in this manner for each image point, are then stored as a phase image in an image storage 17b.

Of course, to determine phase values over the entire camera image, all image points of the camera sensor are scanned by the convolution window. This is indicated by the two arrows Pf1, Pf2 in FIG. 2b.

In a subsequent subtraction unit 18, reference values stored in another image storage 17a are deducted from the phase values in image storage 17b. These reference phase values are mathematically computed phase values corresponding to a nominal measured value, as well as phase values obtained with a calibration measurement. The difference between the measured and reference phase values is stored temporarily in another image storage 19, then converted to analog in a digital-to-analog converter 20, and finally displayed in graph form on a monitor 21 used for data output.

When the bar pattern is oriented diagonal to the lines and columns of the camera sensor, a 3×3 convolution block of image points forms, in effect, a detector arrangement which measures the bar pattern along five equally-spaced steps. Referring to the 3×3 block of image points outlined in FIG. 2b, the five step detectors are formed by the following image points: (1) P64; (2) the average of P54 and P63; (3) the average of P44, P53, and P62; (4) the average of P43 and P52; and (5) P42.

This diagonal orientation of the bar pattern is advantageous for two reasons: First, since a 3×3 block of image points measures five phase steps, the error function can have three zero positions perpendicular to the direction of the bars so that, even with a change of the bar frequency, the phase values can be determined with great accuracy. Second, the distance between the image points measured perpendicular to the direction of the bars, is $1/\sqrt{2}$ smaller than the distance of pixels in adjacent lines and columns of camera sensor 11a, thereby enhancing spatial resolution.

For simplification of the explanation, FIG. 2b shows the window as applied to a 3×3-pixel section of the camera sensor. However, phase value errors may be reduced even further if the intensity values measured over an area of 5×5 image points are used for the convolution operation. With this larger section, the bar pattern can be measured over nine equally-spaced phase steps; and phase errors can be definitely reduced, since the weighted convolution values can be selected so that the error function (perpendicular to the direction of the bars, that is, diagonal to the columns and lines of the camera sensor) has seven zero positions, and three zero positions are possible in the direction of the lines and columns, respectively.

Figure 3:
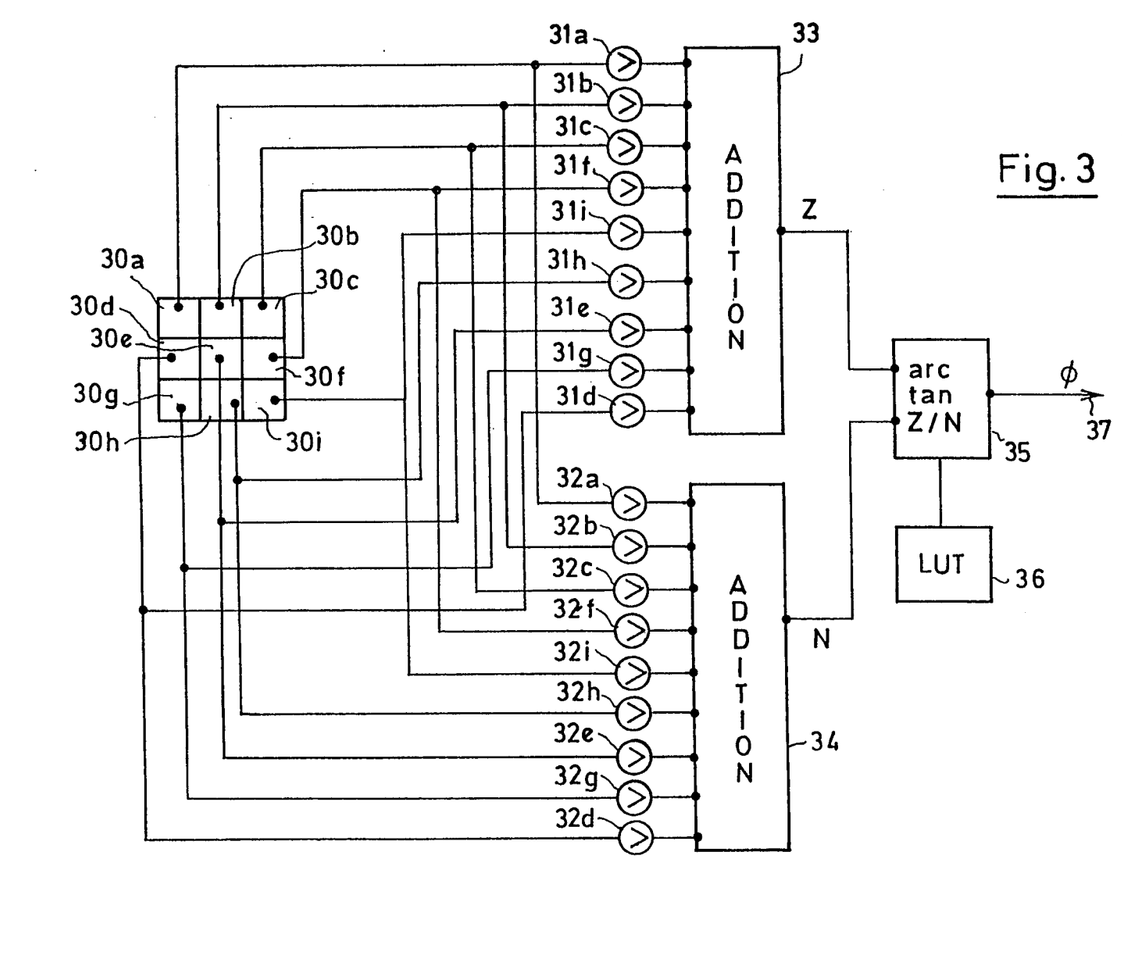
FIG. 3 is a schematic partial circuit of another embodiment showing signal detection means using a 3×3 array of opto-electronic sensors.

Another embodiment of the invention is illustrated in FIG. 3, which shows a measuring arrangement comprising nine photosensors 30a–30i arranged in a square. The output signals of each photosensor 30a–i are fed to two amplification groups 31a–i, 32a–i, respectively, which amplify the output signals of the photosensors 30a–i by fixed factors.

The output signals of the first amplification group 31a–i are accumulated in a first addition unit 33 to calculate an expression Z, and the output signals of the second amplification group 32a–i are added in a second addition unit to calculate a second expression N. From the ratio of both calculated expressions (Z/N), the arc tangent is computed in an arc tangent block 35 and fed to data output as indicated by arrow 37. For the determination of the arc tangent, the function values of the arc tangent are stored in a look-up table 36.

The amplification factors of the two amplification groups 31a–i, 32a–i are selected analogous to the weighted convolution values of a 3×3 convolution window, namely, so that the error function of the phase value in a direction diagonal to the square of the photosensors 30a–i has at least three zero positions. Such a permanently wired sensor arrangement is particularly advantageous for distance measurement with an interferometer such as that represented schematically in FIG. 4.

Figure 4:
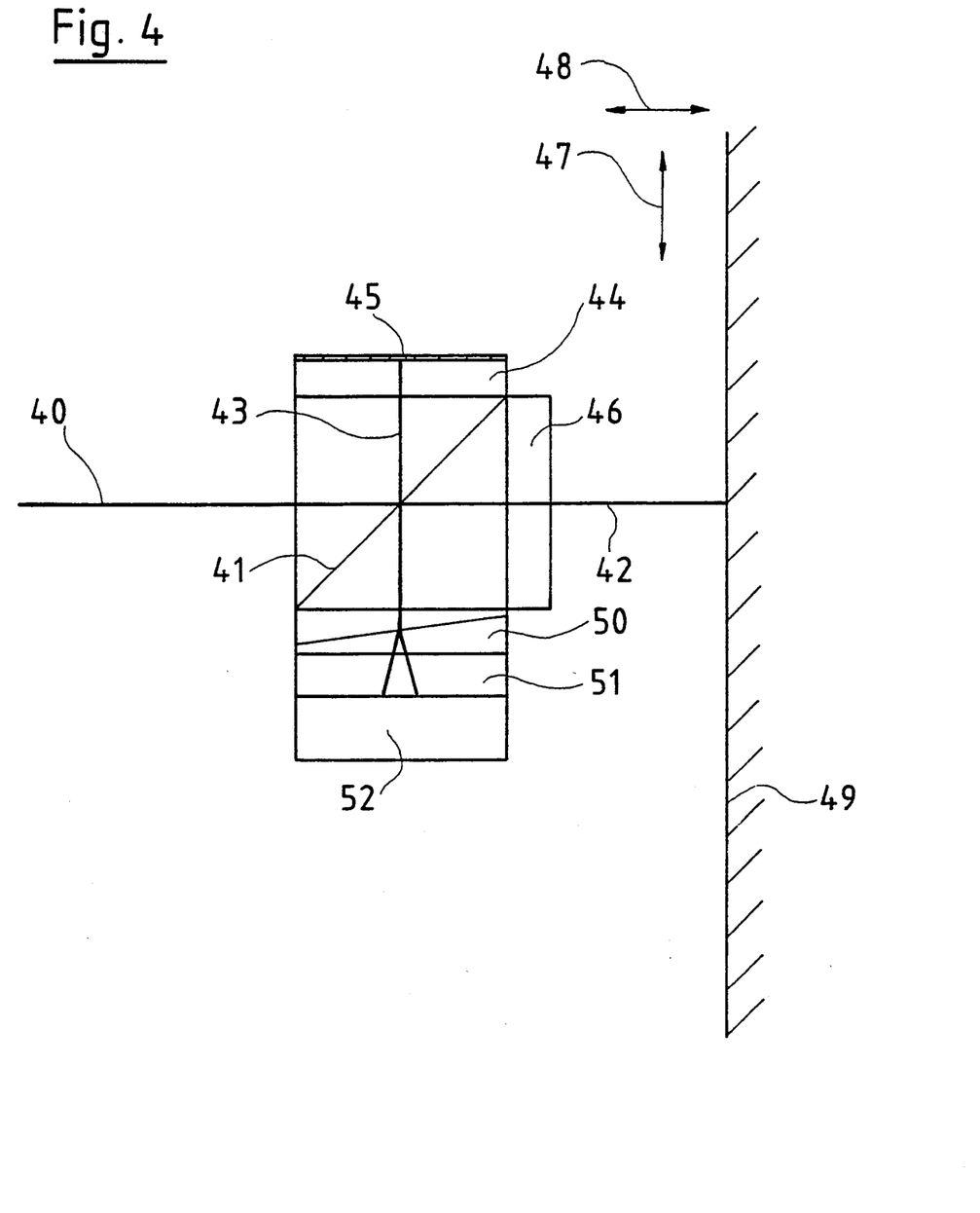
FIG. 4 is a schematic illustration of an interferometer for longitudinal distance measurement which may be improved by the detector arrangement of FIG. 3.

The interferometer shown in FIG. 4 comprises a polarizing beam splitter 41 which deflects an incident laser beam 40 into a measuring beam 42 and a reference beam 43. After passing through a λ/4—plate 44, reference beam 43 is reflected back into itself by a reference mirror 45.

After passing through a second λ/4—plate 46, measuring beam 42 is reflected by a reflecting surface 49 which is movable in the direction of the two arrows 47 and 48. Reflected measuring beam 42 and reflected reference beam 43 are deflected through polarizing beam splitter 41 to a Wollaston prism 50 which causes the two partial beams to be inclined relative to each other.

A polarizer 51, positioned behind the Wollaston prism, allows the beams to interfere with each other. As a result of the inclination, when reflective surface 49 is positioned perpendicular to measuring beam 42, a bar pattern is generated which has a carrier frequency. This bar pattern is appropriately detected by a detector 52 such as that indicated by FIG. 3.

A shift of reflective surface 49 in the direction of the arrow causes a change of the phase ($\phi$) detected by detector 52.

When reflective surface 49 is tilted, the carrier frequency changes. The phase value computed by detector 52, however, is largely independent of this carrier frequency, so that the phase value is also largely independent of a tilting of reflective surface 49.

I claim:

1. An apparatus for phase evaluation of a pattern image used for optical measurement, the intensities of the pattern image being represented by a signal that is phase modulated on a carrier wave, said apparatus comprising:
   an array of individual detectors arranged for producing respective individual signals corresponding to the intensities of said pattern image along a minimum of five different phase steps corresponding to five different nominal phase angles of said carrier wave;
   first and second sets of amplifier circuits for respectively amplifying each individual intensity signal received from said detectors;
   a first adder circuit for receiving and accumulating the amplified individual intensity signals from said first set of amplifier circuits;
   a second adder circuit for receiving and accumulating the amplified individual intensity signals from said second set of amplifier circuits;
   said first and second sets of amplifier circuits being adapted to apply respective amplification factors to said intensity signals as a function of said five nominal phase angles of said carrier wave so that a phase error, which is the amplitude of error that results when phase steps deviate from said nominal phase steps, as a function of said phase steps, has at least three zero positions; and,
   an evaluation unit connected to said first and second adder circuits for determining the phase value from said phase angles.

2. The apparatus of claim 1 wherein said detectors are opto-electronic sensors.

3. The apparatus of claim 2 wherein said sensors are arranged in rows and columns on a surface, and the number of said sensors in said rows equals the number of sensors in said columns.

4. The apparatus of claim 1, wherein:
   said array of detectors defines a camera;
   said first set of amplifier circuits and said first adder circuit are arranged to compute an expression Z as the linear combination $$Z = \sum_{i=1}^{m} a_i Z_i$$

where m is equal to or greater than 3;
   said second set of amplifier circuits and said second adder circuit are arranged to compute an expression N as the linear combination $$N = \sum_{i=1}^{m} a_i N_i$$

where m is equal to or greater than 3;
   Z and N representing, respectively, sine and cosine functions of the modulated wave, and said apparatus further comprising:
   a circuit for computing the ratio Z/N to determined the phase value of the modulated wave; and,
   the expressions $Z_i$ and $N_i$ are selected so that the same correct phase value can be computed by each ratio $Z_i/N_i$ for a signal having the frequency of the carrier wave.

5. The apparatus of claim 4 wherein the camera is a CCD camera, and the pattern image extends diagonally to the columns and rows of the camera sensor.

6. The apparatus of claim 4 wherein said pattern image is formed by interference.

7. The apparatus of claim 4 wherein said pattern image is formed by multiple-bar projection.

8. An apparatus for optical measurement comprising:
   means for directing light to an object to be measured;
   means for generating a pattern image from said light directed to said object and distorted by said object, the pattern image having light intensities representing a phase modulated carrier wave being a superposition of a carrier wave and a modulation wave, the modulation resulting from distortion by said object;
   an array of individual detectors arranged for producing respective individual electrical output signals corresponding to the intensities of said pattern image along a minimum of five different phase angles of the carrier wave, the differences between said phase angles defining nominal phase steps;
   first and second convolution circuits receiving said electrical output signals of said array of individual detectors for convolving the output signals by convolution values and for assigning values to expressions Z and N and forming electrical signal outputs indicative of said expressions Z and N which represent, respectively, sine and cosine functions of said phase angles of said phase modulated wave, whereby the convolution values are selected so that a phase error, which is the amplitude of error that results when phase steps deviate from said nominal phase steps, as a function of said phase steps, has at least three zero positions; and, an arctan circuit receiving the electrical signal outputs of said convolution circuits for computing said phase value of the phase modulated wave by using the ratio Z/N.

9. The apparatus of claim 8, wherein said apparatus is an interferometer.

10. The apparatus of claim 8, wherein the pattern image is formed by multiple-bar projection.

* * * * *

UNITED STATES PATENT AND TRADEMARK OFFICE
CERTIFICATE OF CORRECTION

PATENT NO. : 5,361,312
DATED : November 1, 1994
INVENTOR(S) : Michael Kuchel

It is certified that error appears in the above-indentified patent and that said Letters Patent is hereby corrected as shown below:

In column 5, line 41: delete
"$\phi_1$=arctan[(I1*(cos[P2]-cos[P3])+I2*(cos[P39-cos[P1])+I3*(cos[P1]-cos[P2]))/(I1*(sin[P2]-sin[P3])+I2*(sin[P3]-sin[P1])+I3*(sin[P1]-sin[P2]))]"
and substitute therefor:
-- $\phi_1$=arctan[(I1*(cos[P2]-cos[P3])+I2*(cos[P3]-cos[P1])+I3*(cos[P1]-cos[P2]))/(I1*(sin[P2]-sin[P3])+I2*(sin[P3]-sin[P1])+I3*(sin[P1]-sin[P2]))] --.

In column 5, line 45: delete
"$\phi_2$=arctan[(I2*(cos[P3]-cos[P4])+I3*(cos[P49-cos[P2])+I4*(cos[P2]-cos[P3]))/(I2*(sin[P3]-sin[P4])+I3*(sin[P4]-sin[P2])+I4*(sin[P2]-sin[P3]))]"
and substitute therefor:
-- $\phi_2$=arctan[(I2*(cos[P3]-cos[P4])+I3*(cos[P4]-cos[P2])+I4*(cos[P2]-cos[P3]))/(I2*(sin[P3]-sin[P4])+I3*(sin[P4]-sin[P2])+I4*(sin[P2]-sin[P3]))] --.

UNITED STATES PATENT AND TRADEMARK OFFICE
CERTIFICATE OF CORRECTION

PATENT NO. : 5,361,312
DATED : November 1, 1994
INVENTOR(S) : Michael Kuchel

It is certified that error appears in the above-indentified patent and that said Letters Patent is hereby corrected as shown below:

In column 5, line 49: delete
"$\phi_3$=arctan[(I3*(cos[P4]-cos[P5])+I4*(cos[P59
-cos[P39
)I5*(cos[P3]-cos[P4]))/(I3*(sin[P4]-sin[P5]-
)+I4*(sin[P5]-sin[P3])+I5*(sin[P3]-sin[P4]))]"
and substitute therefor:
-- $\phi_3$=arctan[(I3*(cos[P4]-cos[P5])+I4*(cos[P5]-cos[P3])
+I5*(cos[P3]-cos[P4]))/(I3*(sin[P4]-sin[P5])+I4*(sin[P5]-
sin[P3])+I5*(sin[P3]-sin[P4]))] --.

In column 6, line 40: delete "$\phi$--45°" and substitute
-- $\phi$=-45° -- therefor.

In column 6, line 55: delete "i.e." and substitute -- that is -- therefor.

In column 10, line 38: delete "determined" and substitute -- determine -- therefor.

Signed and Sealed this

Fourteenth Day of February, 1995

Attest:

BRUCE LEHMAN

*Attesting Officer*   *Commissioner of Patents and Trademarks*